United States Patent [19]
Nagura

[11] Patent Number: 5,134,473
[45] Date of Patent: Jul. 28, 1992

[54] IMAGE PICKUP SYSTEM COMPRISING A MEMORY OF A SMALL CAPACITY

[75] Inventor: Riichi Nagura, Tokyo, Japan
[73] Assignee: NEC Corporation, Japan
[21] Appl. No.: 683,871
[22] Filed: Apr. 11, 1991

[30] Foreign Application Priority Data
Apr. 12, 1990 [JP] Japan .................. 2-97331

[51] Int. Cl.⁵ .............................................. H04N 7/18
[52] U.S. Cl. ...................... 358/109; 358/88; 358/3; 358/135; 358/93
[58] Field of Search ............ 358/109, 93, 88, 3, 358/133, 138, 142, 160, 135, 136, 141

[56] References Cited

U.S. PATENT DOCUMENTS

| | | | |
|---|---|---|---|
| 4,613,899 | 9/1986 | Kuwano et al. | 358/86 |
| 4,628,354 | 12/1986 | Nagura | 358/109 |
| 4,689,748 | 8/1987 | Hofmann | 358/109 |
| 4,912,770 | 3/1990 | Seto et al. | 358/109 |
| 4,951,136 | 8/1990 | Dresher et al. | 358/88 |
| 5,027,199 | 6/1991 | Suzuki | 358/88 |

*Primary Examiner*—James J. Groody
*Assistant Examiner*—Michael L. Lee
*Attorney, Agent, or Firm*—Ostrolend, Faber, Gerb & Soffen

[57] ABSTRACT

In an image pickup system which is used on a craft flying over an object zone and comprises a first (photelectric) transducer (21) for producing a first partial (electric) signal representtive of a partial image of a partial zone lying forwardly of the craft flying at a first position and a second transducer (22) for producing a second partial signal representative of another partial image of the partial zone lying directly under the craft flying, an interval of time later, at a second position spaced from the first position by a distance between two partial zones picked up by the first and the second transducers when the craft is at the first position, a compression unit (90) compresses the first and the second partial signals into first and second compressed signals. A delay circuit (54-1) gives the first compressed signal a delay equal to the interval of time and produces a delayed signal. A subtracter (55-1) calculates a difference between the delayed signal and the second compressed signal and produces a difference signal. The first compressed signal and the difference signal are transmitted by a transmitter to a ground station to obtain a stereo image of the object zone. Preferably, th image pickup system should comprise a third transducer (23), another delay circuit (54-2), and another subtracter (55-2). The delay circuit is implemented by a memory.

8 Claims, 9 Drawing Sheets

IMAGE PICKUP SYSTEM COMPRISING A MEMORY OF A SMALL CAPACITY

BACKGROUND OF THE INVENTION

This invention relates to an image pickup system for use in combination with a craft, such as a spacecraft, flying over an object zone which is typically on the ground surface of the earth. Such an image pickup system is particularly useful in a remote sensing system for the earth.

An image pickup system of the type described is used to remotely sense an object zone on board a craft flying over the object zone along a flying direction at a predetermined flight altitude. In a remote sensing system, it is often necessary to pick up a stereo image, such as a stereo topographic image, from the object zone by the use of the image pickup system. In order to provide the stereo image, the object zone should be picked up, along the flying direction at two positions spaced apart from each other, so as to form two optical images of the object zone.

A conventional image pickup system is disclosed in U.S. application Ser. No. 410,104 filed Sept. 20, 1989, by Naoshi Suzuki and for assignment to the instant assignee. In the image pickup system, an optical system is used on the craft to form, on a focusing area of the optical system, optical images of forward and backward zones lying transversely of the flying direction in the object zone. The forward and the backward zones are positioned at a predetermined distance along the flying direction. Forward and backward optical images are picked up from the forward and the backward zones. The forward and the backward optical images are transduced into forward and backward electric signals by using forward and backward photoelectric transducers, respectively, placed on the focusing area with a gap left therebetween. The forward and the backward electric signals are transmitted from a transmitter of the craft to a ground station at a predetermined transmission rate.

Transmitted from the craft, the forward and the backward electric signals are produced so that the forward and the backward optical images are reproduced in the ground station to provide the stereo image. In practice, the forward electric signal is delayed by a predetermined time duration into a delayed signal in the ground station. The predetermined time duration is such that the delayed electric signal appears concurrent with the backward electric signal. In other words, the delayed signal is produced after the craft flies the predetermined distance.

A recent requirement is to provide the stereo topographic or a like image at a high resolution so as to make up a precise stereo topography or the like. This requirement gives rise to an increase of the forward and the backward electric signals in number. This means that it is necessary to carry out data compression of the forward and the backward electric signals. In this event, the craft must carry the memory having a large capacity. It is undesirable that the memory has a large capacity because the craft is restricted in size, power consumption, and weight.

SUMMARY OF THE INVENTION

It is therefore an object of this invention to provide an image pickup system which comprises a memory of a reduced memory capacity for use as a delay circuit.

It is another object of this invention to provide an image pickup system the type described which comprises a data compression circuit of a simple structure for use in reducing the memory capacity of the memory.

Other object of this invention will become clear as the description proceeds.

On describing the gist of this invention, it is possible to understand that an image pickup system is for a craft having a predetermined direction and flying over an object zone. The system comprises an optical system for producing an optical image of the object zone, image processing means including first and second photoelectric transducers for transducing the optical image to first and second partial electric signals representative of first and second partial zones of the object zone, respectively, which are spaced apart by a first preselected distance along the predetermined direction. The first and the second photoelectric transducers are spaced apart from each other along the predetermined direction by a first predetermined distance and lie transversely of the predetermined direction. The first predetermined distance determines for the optical system a first visual angle related to the first preselected distance. The system further comprises an image signal processor for processing the first and the second partial electric signals to produce a processed signal and for supplying the processed signal to a transmitter. The craft flies for a first duration from a first position to a second position spaced apart from the first position by the first preselected distance.

According to this invention, the image signal processor comprises: compression circuit connected to the first and the second photoelectric transducers for compressing the first and the second partial electric signals into first and second compressed signals; first delay circuit connected to the compression circuit for giving the first compressed signal a first delay equal to the first duration to produce a first delayed signal having the first delay relative to the first compressed signal; a first subtracter connected to the first delay circuit and the compression circuit for calculating a first difference between the first delayed signal and the second compressed signal to produce a first difference signal representative of the first difference: and supplying means connected to the compression circuit and the first subtracter for supplying the first compressed signal and the first difference signal to the transmitter collectively as the processed signal.

DESCRIPTION OF THE PREFERRED EMBODIMENT

Figure 1:
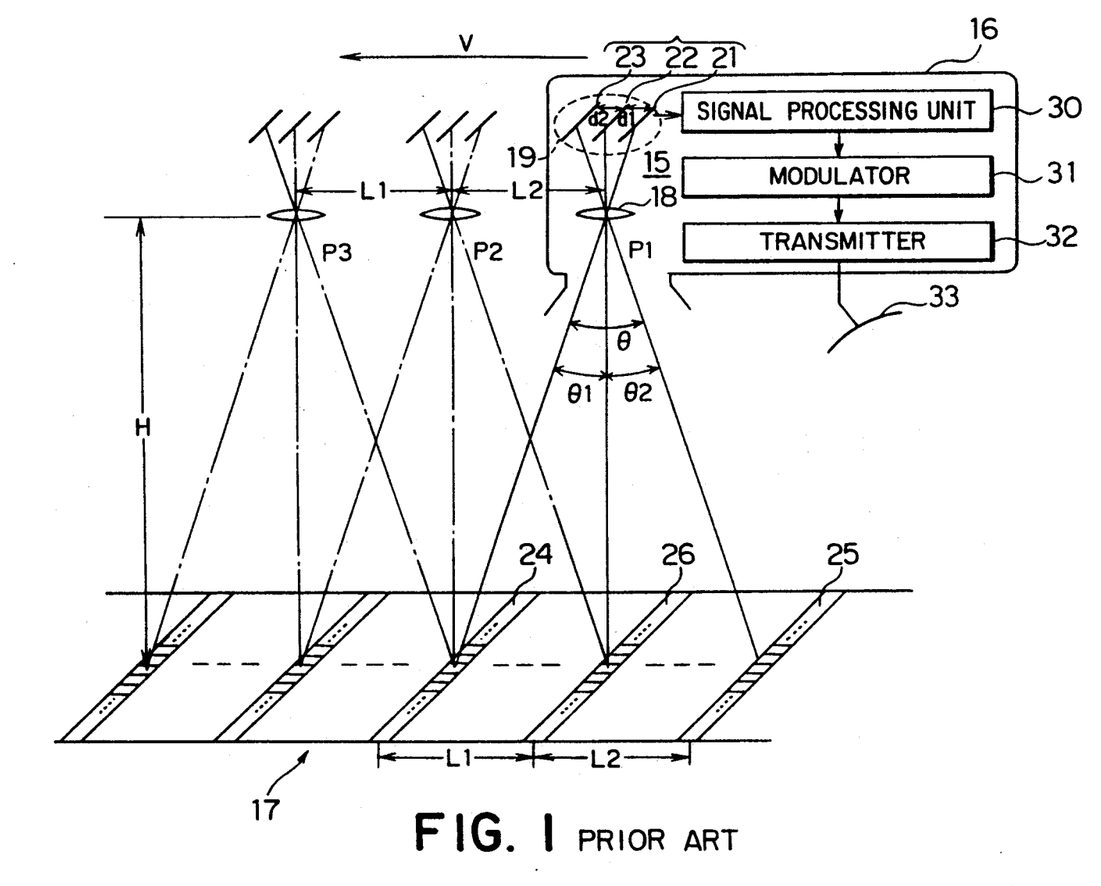
FIG. 1 is a pictorial schematic view of an object zone and a craft at three positions for use in describing a conventional image pickup system.

Referring to FIG. 1, description will be made as regards a conventional image pickup system in order to facilitate a clear understanding of this invention. The conventional image pickup system is of the type disclosed in the Suzuki patent application referred to hereinabove.

In FIG. 1, an image pickup apparatus 15 is carried on a craft which is symbolically depicted at 16. It is assumed that the craft 16 has a velocity V (meter/second) and flies over an object zone 17 at a flight altitude H and along a flying direction depicted by an arrow labelled V. The image pickup apparatus 15 serves to pick up a stereo image and a nonstereo or mono image from the object zone 17. The craft 16 is assumed to be present at a first position P1 at a first instant.

The apparatus 15 comprises an optical system 18 directed towards the object zone 17. The object zone 17 forms a visual angle $\theta$ at the optical system 18. The optical system 18 forms an optical image of the object zone 17 on a focusing area 19. As will later be described more in detail, first through third photoelectric transducers 21, 22, and 23 are arranged parallel on the focusing area 19 transversely of the flying direction. The first photoelectric transducer 21 is spaced apart from the second photoelectric transducer 22 by a first predetermined distance d1 backwardly of the flying direction. The third photoelectric transducer 23 is spaced apart from the second photoelectric transducer 22 by a second predetermined distance d2 forwardly of the flying direction.

The visual angle $\theta$ defines forward and backward partial zones 24 and 25. The object zone 17 is divided along the flying direction into a plurality of partial zones from which partial optical images are picked up to be focused on the focusing area 19. In the example being illustrated, only a right or directly under partial zone 26 and the forward and the backward partial zones 24 and 25 are illustrated. The right under partial zone 26 is between the forward and the backward partial zones 24 and 25 and lies right under the craft 16 at the first instant. The forward partial zone 24 is positioned at a first zone distance L1 (meters) forward from the backward partial zone 25 along the flying direction. The backward partial zone 25 is positioned at a second zone distance L2 backward from the right under partial zone 26. The first predetermined distance d1 is defined by a first visual angle $\theta 1$ which corresponds to the first zone distance L1, namely, the forward and the right under partial zones 24 and 26. The second predetermined distance d2 is defined by a second visual angle $\theta 2$ which corresponds to the second zone distance L2, namely, the backward and the right under partial zones 25 and 26.

The first photoelectric transducer 21 transduces the partial optical image picked up from the forward partial zone 24 to a forward electric signal. The second and the third photoelectric transducers 22 and 23 transduce the partial optical images of the right under partial zone 26 and the backward partial zone 25 to right under and backward electric signals, respectively.

The craft 16 flies from the first position P1 to a second position P2 in a first time duration t1 (seconds) and flies from the second position P2 to a third position P3 in a second time duration t2 (seconds). The first and the second distances L1 and L2 are given by:

$$L1 = H\tan\theta 1,$$

and $$L2 = H\tan\theta 2.$$

The first and the second time durations t1 and t2 are given by:

$$t = L1/V,$$

and $$t2 = L2/V.$$

As well known in the art, the stereo image is formed by processing the forward electric signal derived from the first photoelectric transducer 21 at the position P1 and the backward electric signal later derived from the third photoelectric transducer 23 at the third position P3.

Each of the first through the third photoelectric transducers 21 to 23 may be, for example, a charge-coupled device (CCD). Accordingly, the first through the third photoelectric transducers 21 to 23 produce successions of image pulses having a constant readout frequency and a variable amplitude as image pulse successions. Each of the image pulses has a predetermined pulse width and corresponds to one of picture elements.

The craft 16 carries a signal processing unit 30, a modulator 31, a transmitter 32, and an antenna 33. The image pulse successions are sent from the first through the third photoelectric transducers 21 to 23 to the signal processing unit 30. The signal processing unit 30 encodes the image pulse successions into an encoded image data succession. The encoded image data may be called a processed signal. The encoded image data are modulated by the modulator 31 into modulated image data. The modulated image data are transmitted from the transmitter 32 through the antenna 33 to a ground station which will be described in the following.

Figure 2:
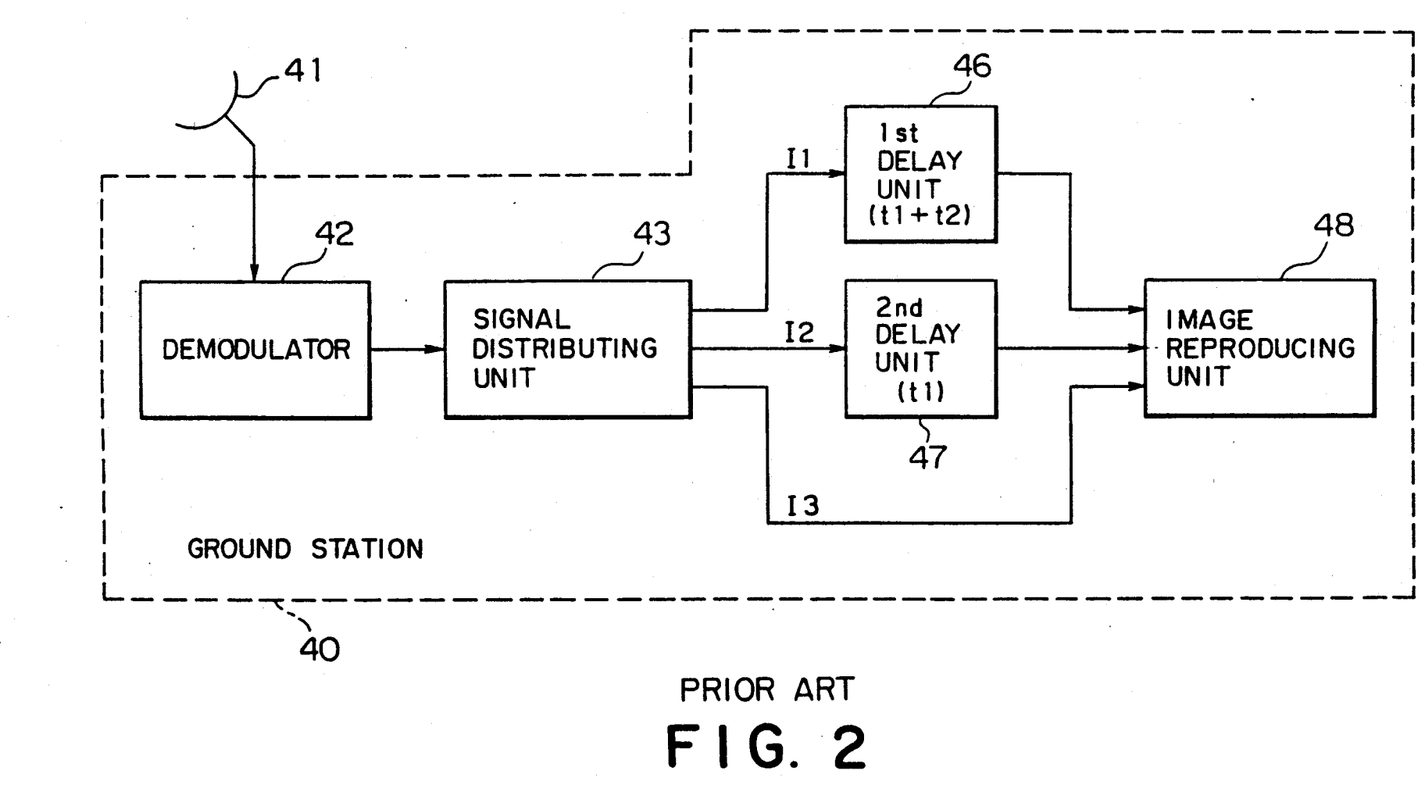
FIG. 2 is a block diagram of a ground station operable as a part of the image pickup system illustrated in FIG. 1.

Referring to FIG. 2, the ground station is symbolically depicted at 40 and is operable as a part of the image pickup system. Transmitted from the craft 16, the modulated image data are received at an antenna 41, sent to a demodulator 42, and demodulated into demodulated image data. Responsive to the demodulated image data, a signal distributing unit 43 divides the demodulated image data into first, second, and third image data trains I1, I2, and I3 which correspond to the first through the third photoelectric transducers 21, 22, and 23, respectively.

The first and the second image data trains I1 and I2 are delivered to first and second delay units 46 and 47 having first and second delay intervals. The first and the second delay intervals will be represented by (t1+t2) and t1, respectively. The first and the second image data trains I1 and I2 are supplied to an image reproducing unit 48 through the first and the second delay units 46 and 47, respectively. The third image data train I3 is sent directly to the image reproducing unit 48. The image reproducing unit 48 reproduces the forward, the right under, and the backward electric signals to form the stereo image.

Referring back to FIG. 1, let the first and the second zone distances L1 and L2 be equal to each other. In this event, the craft 16 flies from the first position P1 to the third position P3 in a time interval (t1+t2). The time interval (t1+t2) is given by:

$$(t1+t2)=(L1+L2)/V.$$

This means that the forward partial zone 24 is again picked up by the third photoelectric transducer 23 the time interval (t1+t2) after the forward partial zone 24 is previously picked up by the first photoelectric transducer 21. Taking the above into consideration, the first delay time of the first delay unit 46 is rendered equal to the time interval (t1+t2) so as to form the stereo image of the forward partial zone 24. The stereo image of the forward partial zone 24 can be obtained by processing the first image data train I1 delayed by the first delay unit 46 and the third image data train I3.

On the other hand, the craft 16 forwardly flies through the first zone distance L1 from the right under partial zone 26 to the forward partial zone 24 during the time interval t1. As a result, the forward partial zone 24 is picked up by the second photoelectric transducer 22. After the time interval (t1+t2), the craft 16 reaches the third position P3. In order to derive the stereo image of the forward partial zone 24, the second delay interval is given to the second image data train I2 by the second delay unit 47.

Figure 3:
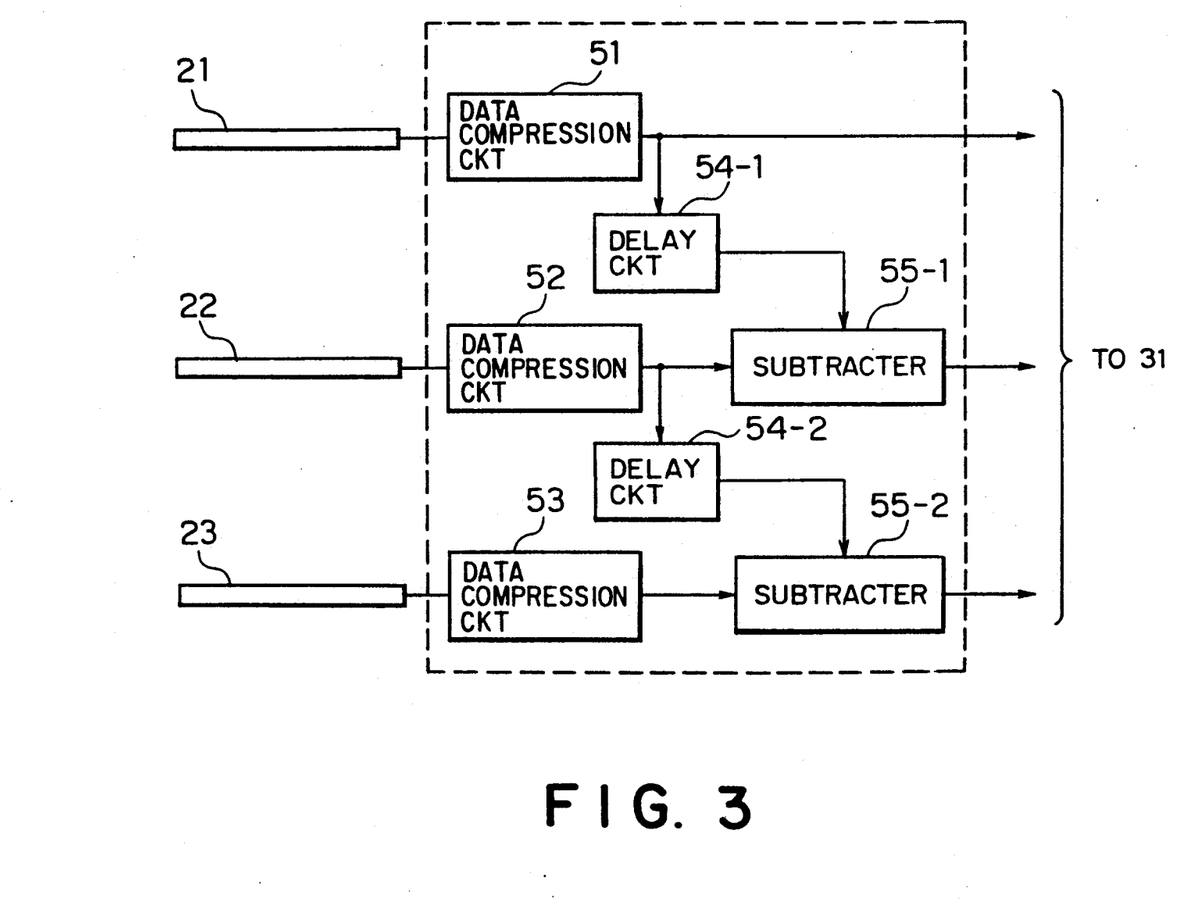
FIG. 3 is a block diagram of a signal processing unit of an image pickup system according to a first embodiment of this invention.
Figure 4:
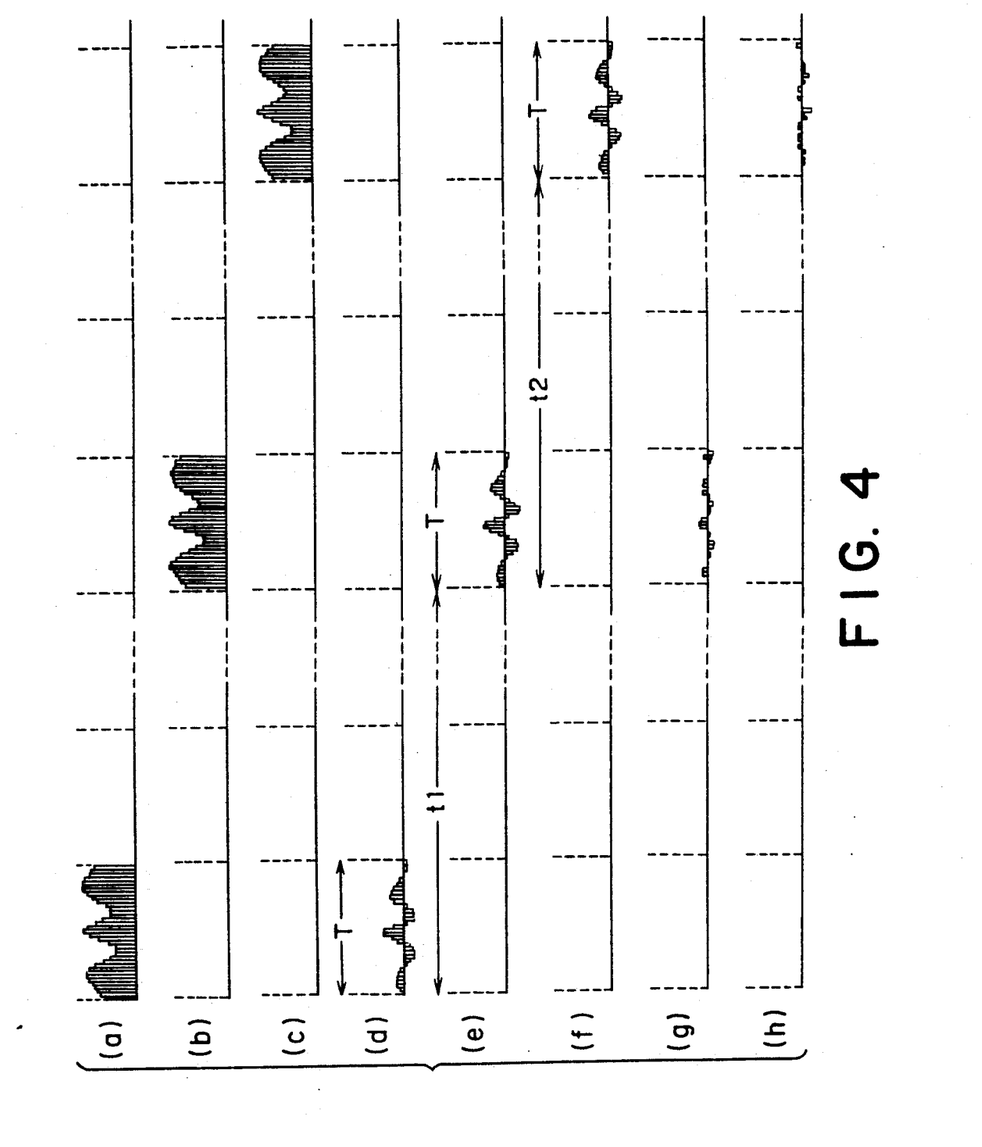
FIG. 4 illustrates signal waveforms for use in describing operation of the signal processing unit illustrated in FIG. 3.

Referring to FIGS. 3 and 4, the description will proceed to a signal processing unit of an image pickup system according to a first embodiment of this invention. The signal processing unit is operable as a part of the image pickup system of the type illustrated in FIG. 1. Although the signal processing unit deals with digital signals, signal waveforms are illustrated in FIG. 4 in an analog form for brevity of the description. The signal processing unit comprises first through third data compression circuits 51, 52, and 53 which are connected to the first through the third photoelectric transducers 21 to 23, respectively.

In FIG. 4, the forward electric signal is illustrated along a first or top line labelled (a) and is produced within a predetermined time period T. The forward electric signal is derived from the forward partial zone 24 at the first position P1. As illustrated along a second line labelled (b), the right under electric signal appears after lapse of the first time duration t1 from appearance of the forward electric signal and is produced within the predetermined time period T. The right under electric signal is derived from the forward partial zone 24 at the second position P2. As shown along a third line labelled (c), the backward electric signal is sent from the third photoelectric transducer 23 after lapse of the second time duration t2 from appearance of the right under electric signal and is produced within the predetermined time period T. The backward electric signal is derived from the forward partial zone 24 at the third position P3. Each of the forward, the right under, and the backward electric signals is a succession of image pulses which have a variable amplitude.

Supplied with the forward, the right under, and the backward electric signals, the first through the third data compression circuits 51 to 53 compress the forward, the right under, and the backward electric signals into firs through third compressed signals, respectively, in a manner which is called a predictive encoding method. The first through the third compressed signals have a variable amplitude and are illustrated along fourth through sixth lines labelled (d), (e), and *(f). It is to be noted here that each of the first through the third compressed signals is illustrated on a twice magnified amplitude scale.

Let each of the forward, the right under, and the backward electric signals is represented by an output bit number equal to ten bits per a single picture element. In this event, the first through the third data compression circuits 51 to 53 compress the forward, the right under, and the backward electric signals into the first through six bits per a single picture element. In other words, the first through the third compressed signals have a reduced amplitude relative to the forward, the right under, and the backward electric signals. The first through the third compression circuits 51 to 53 may be put in operation in accordance with a variable word length method in addition to the predictive encoding method.

The first compressed signal is supplied to a first delay circuit 54-1. The first delay circuit 54-1 gives the first compressed signal a first delay equal to the first time duration t1 and produces a first delayed signal having the first delay relative to the first compressed signal.

A first subtracter 55-1 is supplied with the first delayed signal and the second compressed signal and calculates a first difference between the first delayed signal and the second compressed signal. The first subtracter 55-1 produces a first difference signal representative of the first difference. It is to be noted here that there is a high degree of similarity between the first delayed signal and the second compressed signal because both of the first delayed signal and the second compressed signal are derived from the forward partial zone 24. This means that the first difference signal has a reduced amplitude. As shown along a seventh line labelled (g), the first difference signal has a reduced amplitude relative to the second compressed signal shown along the fifth line labelled (e). In other words, the first difference signal can be represented by the output bit number equal to two or three.

A second delay circuit 54-2 is supplied with the second compressed signal and gives the second compressed signal a second delay equal to the second time duration t2. The second delay circuit 54-2 produces a second delayed signal having the second delay relative to the second compressed signal.

The second delayed signal and the third compressed signal are supplied to a second subtracter 55-2. The second subtracter 55-2 calculates a second difference between the second delayed signal and the third compressed signal and produces a second difference signal representative of the second difference. As illustrated along an eighth or bottom line labelled (h), the second difference signal also has a reduced amplitude relative to the second compressed signal. It is to be noted here that the first and the second difference signals are illustrated on an eight times magnified amplitude scale The first and the second delay circuits 54-1 and 54-2 should be implemented by a memory. In this even, the memory memorizes the first and the second compressed signals as first and second memorized signals. The first memorized signal is read out of the memory as the first delayed signal after lapse of the first time duration t1 from appearance of the forward electric signal. The second memorized signal is read out of the memory as the second delayed signal after lapse of the second time duration t2 from appearance of the right under electric signal. Let the charge-coupled device be of the unidimensional type and has picture elements, 4,000 in number. The optical image of the object zone has picture elements, $16 \times 10^6$ ($4000 \times 4000$) in number. In this event, the conventional image pickup system may need the memory having a capacity approximately equal to 100 megabytes. In contrast, it is possible according to this invention to reduce the capacity of the memory to one-fourth through one-third when the first through the third data compression circuits 51 to 53 are used. It is further possible to reduce the capacity to one-tenth when the first and the second subtracters 55-1 and 55-2 are used in addition to the first through the third data compression circuits 51 to 53.

Through output lines of the first data compression circuit 51, and the first and the second subtracters 55-1 and 55-2, the first compressed signal, and the first and the second difference signals are supplied to the modulator 31 (FIG. 1) as the processed signal. The output lines of the first data compression circuit 51, and the first and the second subtracters 55-1 and 55-2 and the first and the second subtracters 55-1 and 55-2 may be called a supply unit. The modulator 31 modules the first compressed signal, and the first and the second difference signals into first through third modulated signals. The transmitter 32 transmits the firs through the third modulated signals to the ground station through the antenna 33.

Figure 5:
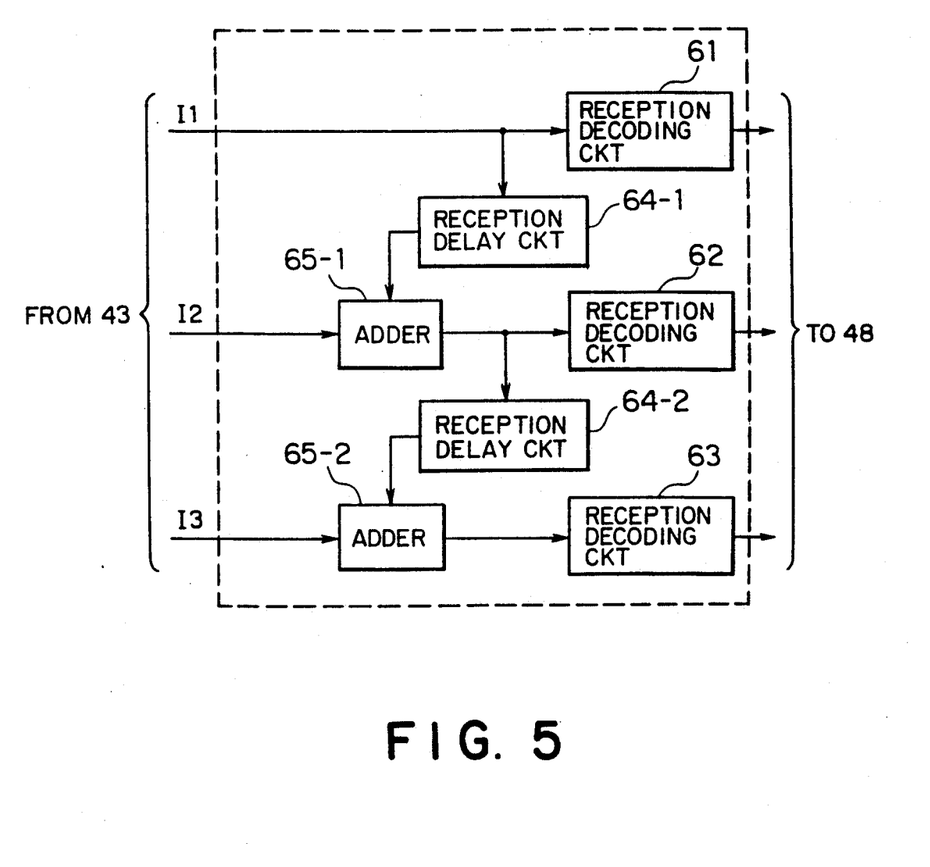
FIG. 5 is a block diagram of a reception signal processing unit operable as a counterpart of the signal processing unit illustrated in FIG. 3.

Referring to FIG. 5, the description will be made as regards a reception signal processing unit operable as a part of the ground station described in conjunction with FIG. 2. The reception signal processing unit is used instead of the first and the second delay units 46 and 47 and is connected between the signal distributing unit 43 and the image reproducing unit 48. The reception signal processing unit is supplied with the first through the third image data trains I1 to I3 from the signal distributing unit 43. The first through the third image data trains I1 to I3 correspond to the first compressed signal and the first and the second difference signals described in conjunction with FIG. 3. The reception signal processing unit is for carrying out inverse process operation relative to the signal processing unit described in connection with FIG. 3. The reception signal processing unit comprises first through third reception decoding circuits 61, 62, and 63 which correspond to the first through the third data compression circuits 51 to 53, respectively.

The first image data train I1 is supplied to the first reception decoding circuit 61 and a first reception delay circuit 64-1. The first reception decoding circuit 61 is for carrying out inverse operation relative to the first data compression circuit 51 (FIG. 3) and decodes the first image data train I1 into a first decoded signal. The firt decoded signal may be called a first reproduced electric signal of the forward electric signal that is transduced by the first photoelectric transducer 21 when the craft 16 is present at the first position P1.

The first reception delay circuit 64-1 gives the first image data train I1 the first delay equal to the first time duration t1 and produces a first delayed train having the first delay relative to the first image data train I1.

A first adder 65-1 is supplied with the first delayed train and the second image data train I2. The first adder 65-1 calculates a first sum of the first delayed train and the second image data train I2 and produces a first sum signal representative of the first sum. The first sum signal is a reproduced signal of the second compressed signal produced by the second data compression circuit 52 (FIG. 3).

The first sum signal is supplied to a second reception delay circuit 64-2 and the second reception decoding circuit 62. The second reception decoding circuit 62 is for carrying out inverse operation relative to the second data compression circuit 52 (FIG. 3) and decodes the first sum signal into a second decoded signal. The second decoded signal may be called a second reproduced electric signal of the right under electric signal that is transduced by the second photoelectric transducer 22 when the craft 16 is present at the second position P2.

The second reception delay circuit 64-2 gives the first sum signal the second delay equal to the second time duration t2 and produces a second delayed train having the second delay relative to the first sum signal.

A second adder 65-2 is supplied with the second delayed train and the third image data train I3. The second adder 65-2 calculates a second sum of the second delayed train and the third image data train I3 and produces a second sum signal representative of the second sum. The second sum signal is a reproduced signal of the third compressed signal produces by the third data compression circuit 53 (FIG. 3).

The third reception decoding circuit 63 is supplied with the second sum signal. The third reception decoding circuit 63 is for carrying out inverse operation relative to the third data compression circuit 53 (FIG. 3) and decodes the second sum signal into a third decoded signal. The third decoded signal may be called a third reproduced electric signal of the backward electric signal that is transduced by the third photoelectric transducer 23 when the craft 16 is present at the third position P3.

The first through the third decoded signals are supplied to the image reproducing unit 48 (FIG. 2). The image reproducing unit 48 processes the first through the third decoded signals and reproduces the stereo image of the forward partial zone 24. It is to be noted here that the stereo image of the forward partial zone 24 can be obtained by processing the first and the second decoded signals. In this event, it is possible to omit the third photoelectric transducer 23, the second delay circuit 54-2, the third compression circuit 53, and the second subtracter 55-2 which are carried by the craft 16. Similarly, it is possible to omit the second reception delay circuit 64-2, the second adder 65-2, and the third reception decoding circuit 63 which are included in the reception signal processing unit.

Figure 6:
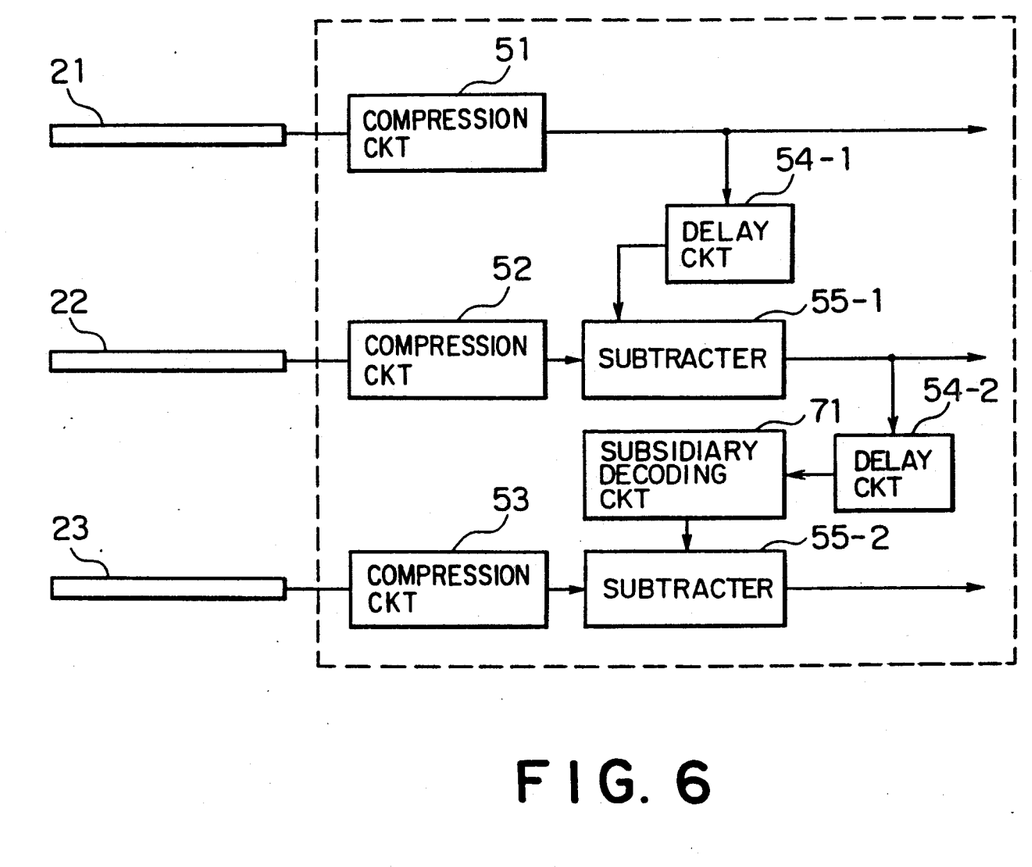
FIG. 6 is a block diagram of a signal processing unit of an image pickup system according to a second embodiment of this invention.
Figure 7:
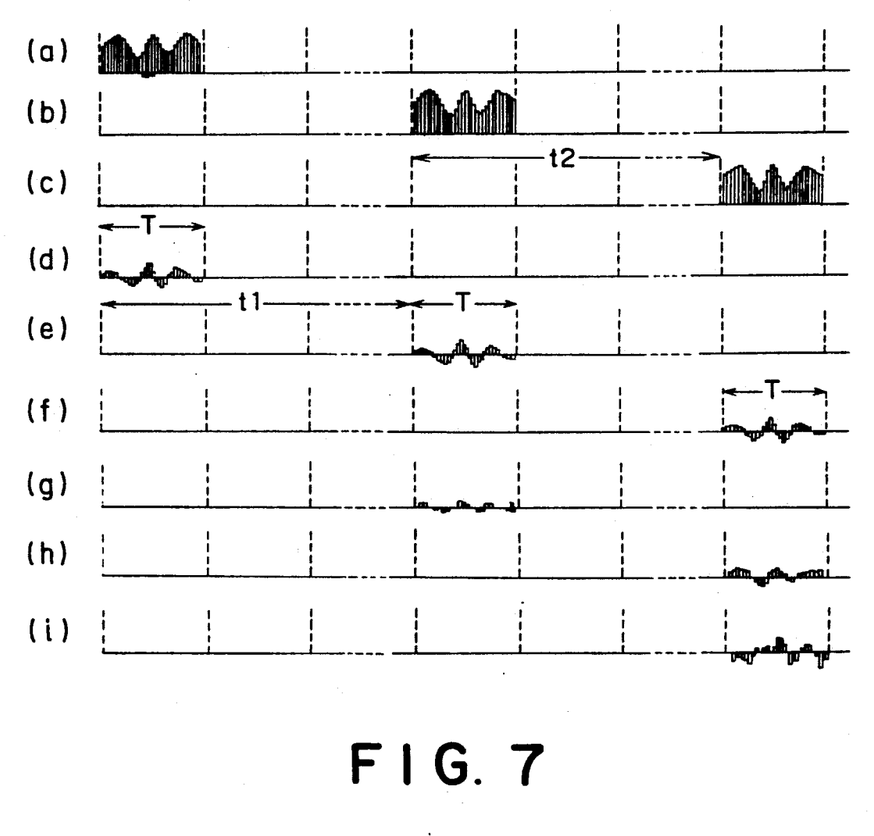
FIG. 7 illustrates signal waveforms for use in describing operation of the signal processing unit illustrated in FIG. 6.

Referring to FIGS. 6 and 7, the description will proceed to a signal processing unit of an image pickup system according to a second embodiment of this invention. The signal processing unit is similar to that illustrated in FIG. 3 and comprises similar parts designated by like reference numerals. It should be noted in this connection that the second delay circuit 54-2 is connected to an output line of the first subtracter 55-1 and that a subsidiary decoding circuit 71 is connected between the second delay circuit 54-2 and the second subtracter 55-2.

In FIG. 7, signal waveforms are illustrated along first through seventh lines. The waveform are similar to those illustrated in FIG. 4.

As described in conjunction with FIG. 3, the first compression circuit 51 produces the first compressed signal. The first subtracter 55-1 produces the first difference signal. The first difference signal is supplied to the second delay circuit 54-2. As described with reference to FIG. 3, the second delay circuit 54-2 gives the firt difference signal the second delay equal to the second time duration t2. The second delay circuit 54-2 produces the second delayed signal having the second delay relative to the first difference signal. It is to be noted here that the first difference signal has a reduced amplitude relative to the second compressed signal produced by the second data compression circuit 52. This means that the second delay circuit 54-2 can be implemented by a memory having a capacity which is further smaller than that of the second delay circuit 54-2 described in conjunction with FIG. 3.

If the second delayed signal is directly supplied to the second subtracter 55-2, the second subtracter 55-2 may produce the second difference signal which is substantially equivalent to the third compressed signal. This is because the second delayed signal has the reduced amplitude. In other words, the second subtracter 55-2 is useless, although desirable unless the subsidiary decoding circuit 71 is used. The second delayed signal is supplied to the subsidiary decoding circuit 71. The subsidiary decoding circuit 71 is for decoding the second delayed signal by inverse operation relative to the predictive encoding method into a subsidiary decoded signal which is substantially equivalent to the first delayed signal.

As illustrated along an eight line labelled (h) in FIG. 7, the subsidiary decoded signal has the amplitude higher than that of the first difference signal illustrated along the seventh line labelled (g) in FIG. 7. It is to be noted here that the subsidiary decoded signal is illustrated on a twice magnified amplitude scale.

The second subtracter 55-2 is supplied with the subsidiary decoded signal and the third compressed signal and calculates the second difference between the subsidiary decoded signal and the third compressed signal. The second subtracter 55-2 produces the second difference signal representative of the second difference. As a result, the second difference signal has a reduced amplitude as illustrated along a ninth or bottom line labelled (i) in FIG. 7. It should be noted here that the second difference signal is illustrated on an eight times magnified amplitude scale.

Figure 8:
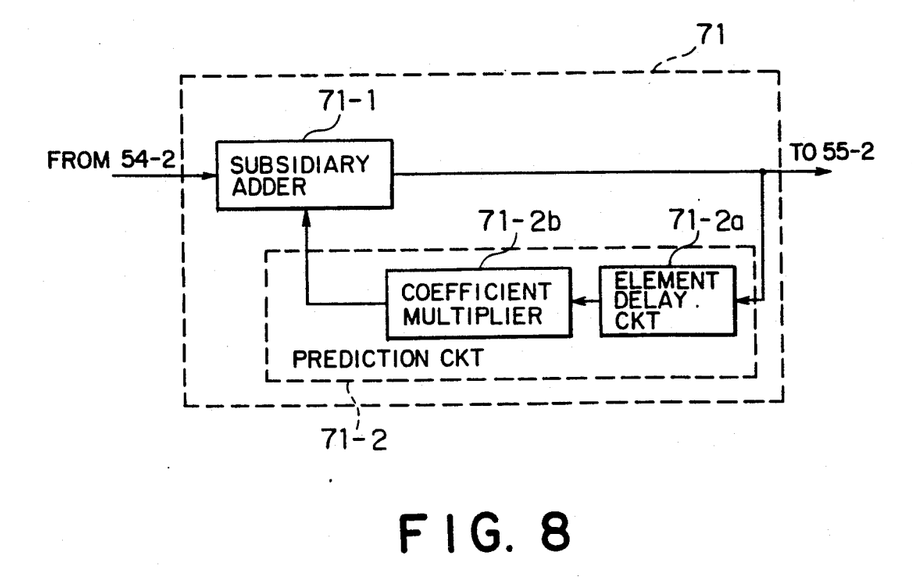
FIG. 8 is a block diagram of a subsidiary decoding circuit which is included in the signal processing unit illustrated in FIG. 6.

Referring to FIG. 8, the subsidiary decoding circuit 71-2. The subsidiary adder 71-1 is for calculating a subsidiary sum of an additional signal and the second delayed signal produced by the second delay circuit 54-2. The subsidiary adder 71-1 produces a subsidiary sum signal representative of the subsidiary sum. The prediction circuit 71-2 comprises an element delay circuit 71-2a and a coefficient multiplier 71-2b. As well known in the art, the element delay circuit 71-2a for giving the subsidiary sum signal a predetermined delay interval of a single picture element. The element delay circuit 71-2a produces a delayed signal having the predetermined delay relative to the subsidiary sum signal. The element delay circuit 71-2a may be called a third delay circuit. The coefficient multiplier 71-2b is for multiplying the subsidiary sum by the predetermined coefficient to produce a multiplied value and supplies a multiplied signal representative of the multiplied value to the subsidiary adder 71-1 as the additional signal. The predetermined coefficient is approximately equal to unity.

The subsidiary decoding circuit 71 may be implemented by an amplifier having a predetermined amplification factor for amplifying the second delayed signal into an amplified signal. The amplifier delivers the amplified signal to the second subtracter as the subsidiary decoded signal. The predetermined amplification factor should be determined to be greater than unity.

Figure 9:
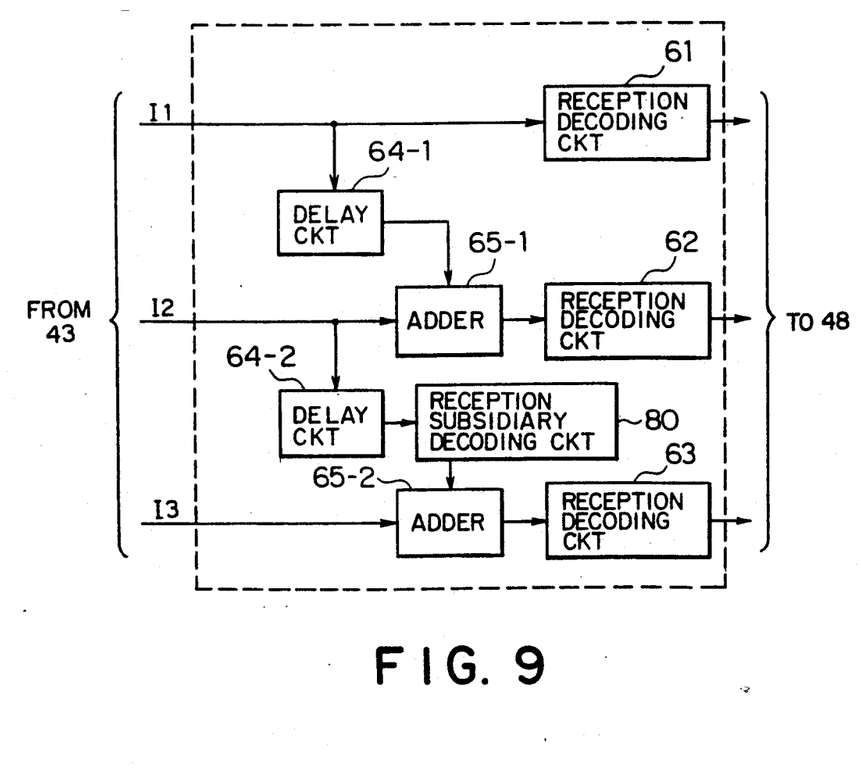
FIG. 9 is a block diagram of a reception signal processing unit operable as a counterpart of the signal processing unit illustrated in FIG. 6.

Referring to FIG. 9, the description will proceed to a reception signal processing unit which is used in the ground station 40 (FIG. 2) and is suitable for the signal processing unit described in connection with FIG. 6. The reception signal processing unit is similar to that illustrated in FIG. 5 and comprises similar parts designated by like reference numerals except that the second reception delay circuit 64-2 is connected to an input line of the first adder 65-1 and that a reception subsidiary decoding circuit 80 is connected between the second reception delay circuit 64-2 and the second adder 65-2. The second reception delay circuit 64-2 is similar to the second delay circuit 54-2 described in conjunction with FIG. 6. Likewise, the reception subsidiary decoding circuit 80 is similar to the subsidiary decoding circuit 71 described in connection with FIG. 6.

The reception signal processing unit is supplied with the first through the third image data trains I1 to I3 from the signal distributing unit 43. The first image data train I1 is supplied to the first reception decoding circuit 61 and the first reception delay circuit 64-1. The first reception decoding circuit 61 decodes the first image data train I1 into the first decoded signal. The first reception delay circuit 64-1 gives the firt image data train I1 the first delay equal to the first time duration t1 and produces the first delayed train having the first delay relative to the first image data train I1.

The first adder 65-1 is supplied with the first delayed train and the second image data train I2. The first adder 65-2 calculates the first sum of the first delayed train and the second image data train I2 and delivers the first sum signal representative of the first sum to the second reception decoding circuit 62. The second reception decoding circuit 62 decodes the first sum signal into the second decoded signal.

The second reception delay circuit 64-2 gives the second image data train I2 the second delay equal to the second time duration t2 and produces the second delayed train having the second delay relative to the second image data train I2. The reception subsidiary decoding circuit 80 is supplied with the second delayed train and decodes the second delayed train into a reception decoded signal by like operation which is carried out by the subsidiary decoding circuit 71 described in conjunction with FIG. 6. The reception decoded signal is supplied to the second adder 65-2 as a reproduced signal of the subsidiary decoded signal produced by the subsidiary decoding circuit 71.

The second adder 65-2 calculates the second sum of the reception decoded signal and the third image data train I3 and produces the second sum signal representative of the second sum. The second sum signal is decoded by the third reception decoding circuit 63 into the third decoded signal. The first through the third decoded signals are supplied to the image reproducing unit 48. (FIG. 2).

Figure 10:
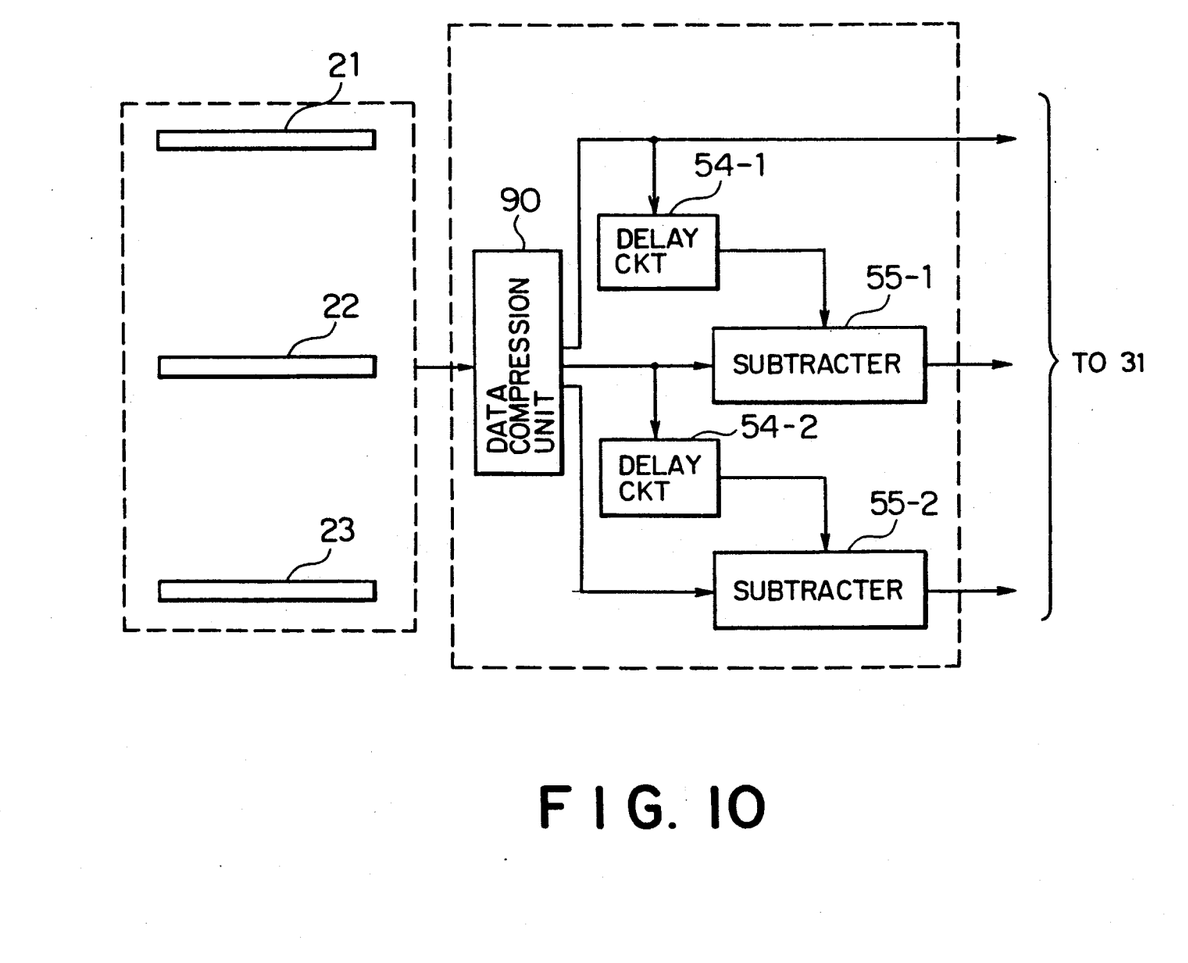
FIG. 10 is a block diagram of a signal processing unit of an image pickup system according to a third embodiment of this invention.

Referring to FIG. 10, the description will be made as regards a signal processing unit according to a third embodiment of this invention. The signal processing unit is similar to that illustrated in FIG. 3. The signal processing unit comprises similar parts designated by like reference numerals except that the signal processing unit is supplied with the forward, the right under, and the backward electric signals collectively as a time divisional multiplexed signal and that a data compression unit 90 is used instead of the first through the third data compression circuits 51 to 53. This is based on the following fact. When used as a combination of the first through the third photoelectric transducers 21 to 23, the charge coupled device produces a device output signal in the form of a succession of the forward, the right under, and the backward electric signals as the time divisional multiplexed signal.

The data compression unit 90 is supplied with the time divisional multiplexed signal and compresses the time divisional multiplexed signal into a compressed signal. The compressed signal consists of first through third partial compressed signals which correspond to the forward, the right under, and the backward electric signals, respectively. The data compression unit 90 supplies at first the first partial compressed signal to the first delay circuit 54-1 and the modulator 31 (FIG. 1) and supplies the second partial compressed signal to the first subtracter 55-1 and the second delay circuit 54-2 after lapse of the first time duration t1 from supply of the first partial compressed signal. Furthermore, the data compression unit 90 sends the third partial compressed signal to the second subtracter 55-2 after lapse of the second time duration t2 from supply of the second partial compressed signal.

The first subtracter 55-1 calculates the first difference between the first delayed signal produced by the first delay circuit 54-1 and the second partial compressed signal and produces the first difference signal representative of the first difference.

The second subtracter 55-2 calculates the second difference between the second delayed signal produced by the second delay circuit 54-2 and the third partial compressed signal and produces the second difference signal representative of the second difference.

The first partial compressed signal and the first and the second difference signals are supplied to the modulator 31 as the processed signal.

While this invention has thus far been described in conjunction with a few embodiments thereof, it will readily be possible for those skilled in the art to put this invention into practice in various other manners. For example, the optical system may form a plurality of optical images of the object zone on a plurality of focusing areas at a time by using a plurality of spectral filters which have spectral characteristics difference from one another. In this case, a plurality of photoelectric transducers are arranged on the respective focusing areas.

What is claimed is:

1. An image pickup system for a craft having a predetermined direction and flying over an object zone, said system comprising an optical system for producing an optical image of said object zone, image processing means including first and second photoelectric transducers for transducing said optical image to first and second partial electric signals representative of partial zones of said object zone, respectively, which are spaced apart by a first preselected distance along said predetermined direction, said first and said second photoelectric transducers being spaced apart from each other along said predetermined direction by a first predetermined distance and lying transversely of said predetermined direction, said first predetermined distance determining for said optical system a first visual angle related to said first preselected distance; and an image signal processor for processing said first and said second partial electric signals to produce a processed signal and for supplying said processed signal to a transmitter, said craft flying for a first duration from a first position to a second position spaced apart from said first position by said first preselected distance, said image signal processor comprising:

a compression circuit connected to said first and said second photoelectric transducers for compressing said first and said second partial electric signals into first and second compressed signals;

a first delay circuit connected to said compression circuit for giving said first compressed signal a first delay equal to said first duration to produce a first delayed signal having said first delay relative to said first compressed signal;

a first subtracter connected to said first delay circuit and said compression circuit for calculating a first difference between said first delayed signal and said second compressed signal to produce a first difference signal representative of said first difference; and supplying means connected to said compression circuit and said first subtracter for supplying said first compressed signal and said first difference signal to said transmitter collectively as said processed signal.

2. An image pickup system as claimed in claim 1, wherein said compression circuit is put in operation in accordance with a predictive encoding method.

3. An image pickup system as claimed in claim 2, wherein said compression circuit is put in operation in accordance with variable word length encoding method in addition to said predictive encoding method.

4. An image pickup system as claimed in claim 3, said image processing means further comprising a third photoelectric transducer spaced apart from said second photoelectric transducer by a second predetermined distance forwardly of said predetermined direction, said second predetermined distance determining for said optical system a second visual angle related to said second partial zone and a third partial zone which are spaced apart from said second partial zone by a second preselected distance backwardly of said predetermined direction, said third partial zone being in correspondence to said third photoelectric transducer, said craft flying in a second duration from said second position to a third position spaced apart from said second position by said second preselected distance, wherein:

said compression circuit is connected to said third photoelectric transducer to produce a third compressed signal;

said image signal processor further comprising:

second delay circuit connected to said compression circuit for giving said second compressed signal a second delay equal to said second duration to produce a second delayed signal having said second delay relative to said second compressed signal;

a second subtracter connected to said compression circuit and said second delay circuit for calculating a second difference between said second delayed signal and said third compressed signal to produce a second difference signal representative of said second difference; and supplying means connected to said compression circuit and said first and said second subtracters for supplying said first compressed signal and said first and said second difference signals to said transmitter collectively as said processed signal.

5. An image pickup system as claimed in claim 3, said image processing means further comprising a third photoelectric transducer spaced apart from said second photoelectric transducer by a second predetermined distance forwardly of said predetermined direction, said second predetermined distance determining for said optical system a second visual angle related to said second partial zone and a third partial zone which are spaced apart from said second partial zone by a second preselected distance backwardly of said predetermined direction, said third partial zone being in correspondence to said third photoelectric transducer, said craft flying in a second duration from said second position to a third position spaced apart from said second position by said second preselected distance, wherein:

said compression circuit is connected to said third photoelectric transducer to produce a third compressed signal;

said image signal processor further comprising:

second delay circuit connected to said compression circuit for giving said second difference signal a second delay equal to said second duration to produce a second delayed signal having said second delay relative to said second difference signal;

partial decoding circuit connected to said second delay circuit for decoding said second delayed signal into a decoded signal;

a second subtracter connected to said compression circuit and said partial decoding circuit for calculating a second difference between said third compressed signal and said decoded signal to produce a second difference signal representative of said second difference; and supplying means connected to said compression circuit and said first and said second subtracters for supplying said first compressed signal and said first and said second difference signals to said transmitter collectively as said processed signal.

6. An image pickup system as claimed in claim 5, each of said first through said third partial electric signals comprising a succession of image pulses, each of said image pulses having a pulse width, wherein said partial decoding means comprises:

an adder circuit connected to said second delay circuit and supplied with an additional signal and said delayed signal for calculating a sum of said additional signal and said second delayed signal to produce a sum signal representative of said sum;

a third delay circuit connected to said adder circuit for giving said sum signal a third delay equal to said pulse width to produce a third delay signal having said third delay relative to said sum signal; and a multiplier connected to said third delay circuit for multiplying said sum by a predetermined coefficient to produce a multiplied signal representative of a multiplied value as said additional signal.

7. An image pickup system as claimed in claim 5, wherein said partial decoding means is an amplifier connected to said second delay circuit and having a predetermined amplification factor for amplifying said second delayed signal into an amplified signal to produce said amplified signal as said decoded signal.

8. An image pickup system for a craft having a predetermined direction and flying over an object zone, said craft flying for a predetermined duration from a first position to a second position spaced apart from said first position by a first preselected distance, said system comprising:

an optical system for producing an optical image of said object zone;

first and second photoelectric transducer for transducing said optical image to first and second partial electric signals representative of first and second partial zones of said object zone, respectively, which are spaced apart by said first preselected distance, said first and said second photoelectric transducers being spaced apart from each other along said predetermined direction by a first predetermined distance and lying transversely of said predetermined direction, said first predetermined distance determining for said optical system a first visual angle related to said first preselected distance;

means for delaying said first partial electric signal by said predetermined duration to produce a delayed signal;

means for calculating a difference between said delayed signal and said second partial electric signal to produce a difference signal; and means for transmitting said first partial electric signal and said difference signal.

* * * * *